US009245479B2

(12) United States Patent
Park

(10) Patent No.: US 9,245,479 B2
(45) Date of Patent: Jan. 26, 2016

(54) DISPLAY DEVICE AND DISPLAY DEVICE DRIVING METHOD

(71) Applicant: Samsung Display Co., Ltd., Yongin, Gyeonggi-Do (KR)

(72) Inventor: Won-Sang Park, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 111 days.

(21) Appl. No.: 14/104,515

(22) Filed: Dec. 12, 2013

(65) Prior Publication Data

US 2015/0009242 A1 Jan. 8, 2015

(30) Foreign Application Priority Data

Jul. 5, 2013 (KR) ........................ 10-2013-0079284

(51) Int. Cl.
*G06F 3/038* (2013.01)
*G09G 3/32* (2006.01)

(52) U.S. Cl.
CPC ...... *G09G 3/3233* (2013.01); *G09G 2300/0452* (2013.01); *G09G 2320/0242* (2013.01); *G09G 2320/045* (2013.01); *G09G 2320/0666* (2013.01)

(58) Field of Classification Search
CPC .................................................... G09G 3/3225
See application file for complete search history.

(56) References Cited

U.S. PATENT DOCUMENTS

| | | | | |
|---|---|---|---|---|
| 2006/0262053 | A1* | 11/2006 | Lee et al. | 345/76 |
| 2008/0224968 | A1* | 9/2008 | Kashiwabara | 345/83 |
| 2012/0105517 | A1* | 5/2012 | Yang et al. | 345/694 |
| 2012/0256938 | A1* | 10/2012 | So | 345/589 |
| 2013/0070006 | A1* | 3/2013 | Yang et al. | 345/694 |
| 2013/0105778 | A1* | 5/2013 | Kim et al. | 257/40 |

FOREIGN PATENT DOCUMENTS

| | | | |
|---|---|---|---|
| KR | 1020080011659 | A | 2/2008 |
| KR | 1020120072679 | A | 7/2012 |
| KR | 1020120075271 | A | 7/2012 |

* cited by examiner

*Primary Examiner* — Lixi C Simpson
(74) *Attorney, Agent, or Firm* — Cantor Colburn LLP

(57) ABSTRACT

A display device includes: a signal controller which receives an input image signal and generates a changed image signal, where the signal controller divides the inputted image signal into red, green and blue image signals, changes the blue image signal to a first blue image signal or a second blue image signal, matches white balance of the red, green, first blue or second blue image signals, and generates the changed image signal by compensating a gamma value of the red, green, first blue or second blue image signals; a display panel which displays an image corresponding to the changed image signal, where the display panel includes a pixel including red, green, first blue and second blue sub-pixels; and a data driver which receives the changed image signal from the signal controller and applies a data voltage corresponding to the changed image signal to the display panel.

19 Claims, 5 Drawing Sheets

DISPLAY DEVICE AND DISPLAY DEVICE DRIVING METHOD

This application claims priority to Korean Patent Application No. 10-2013-0079284, filed on Jul. 5, 2013, and all the benefits accruing therefrom under 35 U.S.C. §119, the content of which in its entirety is herein incorporated by reference.

BACKGROUND (a) Field

Exemplary embodiments of the invention relate to a display device and a driving method of the display device. More particularly, Exemplary embodiments of the invention relate to a display device and a driving method of the display device, in which a blue image signal is changed to a deep blue image signal and a cyan blue image signal.

(b) Description of the Related Art

In general, in a conventional display device including an organic light emitting diode ("OLED"), as the color of blue pixels in the display device approaches deep blue, light emitted from the blue pixels typically becomes substantially close to an ultraviolet ("UV") light, such that OLED molecules therein may be deteriorated, and a life-span of the display device may be thereby decreased.

In such a conventional display device, deep blue has a relatively lower luminance, and life-span of the display device may be decreased when the luminance of the deep blue is increased to maintain a white balance.

SUMMARY

Exemplary embodiments of the invention relate to a display device with improved life-span and reduced power consumption by dividing blue sub-pixels thereof into deep blue sub-pixels and cyan blue sub-pixels.

An exemplary embodiment of the invention provides a display device including: a signal controller configured to receive an input image signal and to generate a changed image signal, where the signal controller divides an inputted image signal into red, green and blue image signals, changes the blue image signal to at least one of a first blue image signal and a second blue image signal, matches white balance of at least one of the red, green, first blue, and second blue image signals, and generates a change image signal by compensating a gamma value of the at least one of the red, green, first blue and second blue image signals; a display panel configured to configured to display an image corresponding to the changed image signal, where the display panel includes a pixel including a red sub-pixel, a green sub-pixel, a first blue sub-pixel and a second blue sub-pixel; and a data driver configured receive the changed image signal from the signal controller and to apply a data voltage corresponding to the change image signal to the display panel.

In an exemplary embodiment, the signal controller may include a mode selector configured to change the blue image signal to the at least one of the first blue image signal and the second blue image signal based on a driving mode; a white balance matcher configured to generate a white balanced image signal by matching the white balance of the at least one of the red, green, cyan blue and deep blue image signals; a gamma compensator configured to generate a compensated image signal by compensating a gamma value of the white balanced image signal; and a data driving signal controller configured to generate the changed image signal based on the compensated image signal.

In an exemplary embodiment, when the driving mode is a normal mode, the mode selector may change the blue image signal to a combination of the first blue image signal and the second blue image signal.

In an exemplary embodiment, the mode selector may change the blue image signal to a combination of the first blue image signal and the second blue image signal according to a predetermined blue ratio, which is a ratio between a first blue image and a second blue image in the image corresponding to the changed image signal.

In an exemplary embodiment, the blue ratio may be greater than 1.

In an exemplary embodiment, when the driving mode is a bio-clock mode, the bio-clock mode may include a day mode and a night mode, and the mode selector may change the blue image signal to the first blue image signal when the driving mode is the day mode, and may change the blue image signal to the second blue image signal when the driving mode is the night mode.

In an exemplary embodiment, when the driving mode is a wake-up mode, the mode selector may change the blue image signal to the first blue image signal after a wake-up time In an exemplary embodiment, when the driving mode is a sleep mode, the mode selector may change the blue image signal to the second blue image signal after a sleep time In an exemplary embodiment, the first blue sub-pixel may display a first blue image in the image corresponding to the changed image signal, and the second sub-pixel may display a second blue image in the image corresponding to the changed image signal.

In an exemplary embodiment, an emission layer of the first blue sub-pixel may include a fluorescent material which emits blue light, and an emission layer of the second sub-pixel may include a phosphorescent material which emits blue light.

In an exemplary embodiment, an emission layer of the first blue sub-pixel may include a fluorescent material and a phosphorescent material, and emit light having a wavelength of about 440 nanometers (nm), and an emission layer of the second blue sub-pixel may include the fluorescent material and the phosphorescent material, and emit light having a wavelength of about 464 nm.

Another embodiment of the invention provides driving method of a display device including: dividing an inputted image signal into red, green and blue image signals; changing the blue image signal to at least one of a first blue image signal and a second blue image signal; generating a white balanced image signal by matching white balance of at least one of the red, green, first blue and second blue image signals; and generating a change image signal by compensating a gamma value of the white balanced image signal to transmit the change image signal to a data driver of the display device.

In an exemplary embodiment, the changing the blue image signal to the at least one of the first blue image signal and the second blue image signal may include changing the blue image signal to at least one of the first blue image signal and the second blue image signal based on a driving mode.

In an exemplary embodiment, the changing the blue image signal to the at least one of the first blue image signal and the second blue image signal may include changing the blue image signal to a combination of the first blue image signal and the second blue image signal.

In an exemplary embodiment, the changing the blue image signal to the at least one of the first blue image signal and the second blue image signal may include changing the blue image signal to a combination of the first blue image signal and the second blue image signal based on a predetermined blue ratio, which is a ratio between a first blue image and a second blue image in an image to be displayed by the display device based on the changed image signal.

In an exemplary embodiment, the predetermined blue ratio may be greater than 1.

In an exemplary embodiment, when the driving mode is a bio-clock mode, the bio-clock mode may include a day mode and a night mode, and the changing the blue image signal to the at least one of the first blue image signal and the second blue image signal may include: changing the blue image signal to the first blue image signal when the driving mode is the day mode; and changing the blue image signal to the second blue image signal when the driving mode is the night mode.

In an exemplary embodiment, the changing the blue image signal to the at least one of the first blue image signal and the second blue image signal may include changing the blue image signal to the first blue image signal after a wake-up time when the driving mode is a wake-up mode.

In an exemplary embodiment, the changing the blue image signal to the at least one of the first blue image signal and the second blue image signal may include changing the blue image signal to the second blue image signal after a sleep time when the driving mode is a sleep mode.

In exemplary embodiments of the display device and the driving method display device as disclosed herein, the life-span of the display device, e.g., a display device including an organic light emitting diode ("OLED"), is increased and power consumption of the display device is substantially reduced. In such embodiments, the display device and the driving method display device may display an image with an ultra-high definition ("UD") color standard and provide bio-clock functions.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
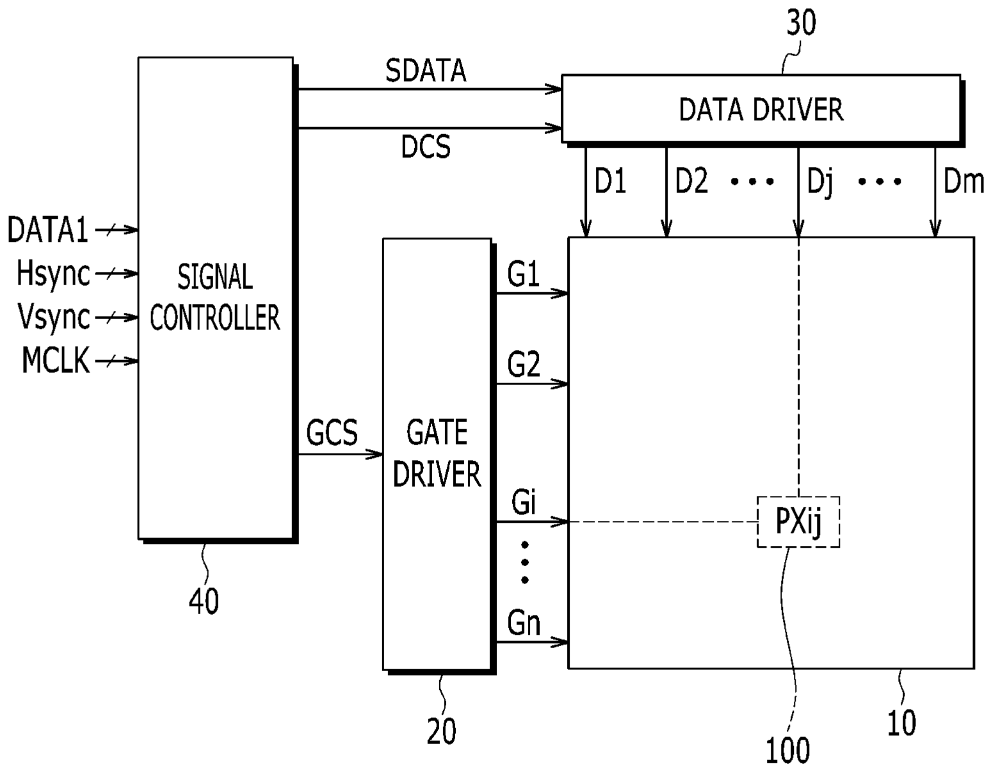
FIG. 1 is a block diagram showing an exemplary embodiment of a display device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a block diagram showing an exemplary embodiment of a display device according to the invention.

Figure 2:
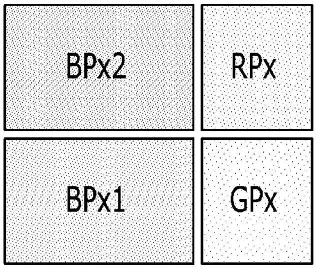
FIG. 2 is a plan view showing a pixel structure of an exemplary embodiment of a display device the invention.

FIG. 2 is a plan view showing a pixel structure of an exemplary embodiment of a display device according to the invention.

Referring to FIG. 1, an exemplary embodiment of the display device with reduced power consumption according to the invention includes a display panel 10 including a plurality of pixels 100, a gate driver 20, a data driver 30, and a signal controller 40 configured to control the display panel 10, the gate driver 20 and the data driver 30.

The signal controller 40 is connected to the gate driver 20 and the data driver 30, and receives an image data signal DATA1, e.g., a red-green-blue ("RGB") image signal including each grayscale data of red R, blue B and green G and a control signal. In an exemplary embodiment, the control signal includes a horizontal synchronous signal Hsync, a vertical synchronous signal Vsync and a main clock signal MCLK.

In such an embodiment, the signal controller 40 divides the image data signal DATA1 into a red image signal, a green image signal and a blue image signal, and changes the blue image signal to at least one of a cyan blue image signal B1 and a deep blue image signal B2. In such an embodiment, the signal controller 40 generates a data driving control signal DCS and a gate driving control signals GCS based on the control signal.

The signal controller 40 adjusts white balance of the image data signal including the red image signal R, the green image signal G, and the at least one of the cyan blue image signal B1 and deep blue image signal B2 (e.g., white balance of red, green and cyan blue images signals, white balance of the red, green and deep blue image signals, or white balance of the red, green, cyan blue and deep blue image signals), and generates a changed image data signal SDATA by performing gamma compensation on the image data signal, white balance of which is adjusted.

In one exemplary embodiment, for example, the cyan blue may be defined as a blue having a center wavelength of about 464 nanometers (nm), and the deep blue may be defined as a blue having a center wavelength of about 440 nm. In such an embodiment, a viewer who views the cyan blue having the center wavelength of about 464 nm may feel an awakening effect, and a viewer who views the deep blue having the center wavelength of about 460 nm may feel a sleep-inducing effect.

A blue image may be displayed on a pixel 100 using the cyan blue having the center wavelength of about 464 nm, thereby increasing life-span of the pixel 100 of an exemplary embodiment of the display device according to the invention.

In an exemplary embodiment, the display device includes a cyan blue sub-pixel and a deep blue sub-pixel, and generates data signal corresponding to the cyan blue sub-pixel and the deep blue sub-pixel from the blue image signal to facilitate selective light emission of at least one of the cyan blue and deep blue sub-pixels.

In one exemplary embodiment, for example, the combination of cyan blue and deep blue is predetermined, e.g., calculated, to improve power consumption by employing sub-pixels including a phosphorescent blue material and conforming to an ultra-high definition ("UD") color standard. The signal controller 40 stores the predetermined combination (e.g., calculated combination) and changes an inputted blue image signal to a data signal for facilitating light emission of at least one of the cyan blue sub-pixel and the deep blue sub-pixel. The combination may be varied based on a driving mode of the display device. The combination may be defined as a light emitting ratio between the cyan blue and the deep blue.

The gate driver 20 is controlled by the gate driving control signals GCS. In such an embodiment, the gate driver 20 generates a plurality of gate signals, and transmits the gate signals to a plurality of gate lines G1 to Gn connected to the display panel 10.

The gate driver 20 may include a shift register for sequentially generating a plurality of gate signals in response to a start signal of the gate driving control signals GCS, and a level shifter for shifting a voltage of the gate signals to a predetermined voltage level, e.g., a voltage level that is adequate for driving the pixels.

The data driver 30 samples the changed image data signal SDATA based on the data driving control signal DCS, then latches the sampled changed image data signal SDATA, line by line, to change the latched image data signal to a plurality of data voltages, and applies the data voltages to the pixels selected by the gate signals.

The display panel 10 includes a plurality of pixels 100 connected to the gate lines G1 to Gn and the data lines D1 to Dm, which intersect each other. In an exemplary embodiment, the pixels 100 may be defined by the gate lines G1 to Gn and the data lines D1 to Dm.

Referring to FIG. 2, in an exemplary embodiment, each of the pixels 100 may include red, green, cyan blue and deep blue sub-pixels RPx, GPx, BPx1 and BPx2.

In one exemplary embodiment, for example, the cyan blue sub-pixel BPx1 emits cyan blue light having the center wavelength of about 440 nm, and the deep blue sub-pixel BPx2 emits deep blue light having the center wavelength of about 464 nm.

In such an embodiment, an emission layer ("EML") of the cyan blue sub-pixel BPx1 may include a fluorescent material that emits blue light having the center wavelength of about 440 nm, and an EML of the deep blue sub-pixel BPx2 may include a fluorescent material that emits blue light having the center wavelength of about 464 nm.

In an alternative exemplary embodiment, EMLs of the cyan blue sub-pixel BPx1 and the deep blue sub-pixel BPx2 may include a mixture of the fluorescent material that emits blue light and the phosphorescent a fluorescent material that emits blue light such that the cyan blue sub-pixel BPx1 and the deep blue sub-pixel BPx2 are resonance-designed to emit light having the wavelengths of about 440 nm and about 464 nm, respectively.

In an embodiment of the display device, a blue color conforming to the UD color standard may be displayed by two sub-pixels B1 and B2, and power consumption thereof is substantially reduced by a sub-pixel including a phosphorescent material that emits blue light.

Referring to FIG. 2, each of the pixels 100 of an exemplary embodiment of the display device includes the deep blue sub-pixel BPx2, the cyan blue sub-pixel BPx1, the red sub-pixel RPx, and the green sub-pixel GPx, which are arranged at an upper left end, a lower left end, an upper right end, and a lower right end, respectively. FIG. 2 merely shows an arrangement of the sub-pixels in each of the pixels 100 of one exemplary embodiment of the display device, and the arrangement of sub-pixels in each of the pixels 100 may be variously modified.

In an exemplary embodiment, each of the pixels 100 is connected to a corresponding gate line of the gate lines G1 to Gn and a corresponding data line of the data lines D1 to Dm, and the pixels 100 are arranged substantially in a matrix form, where each of n and m is a natural number equal to or greater than 2).

The gate lines G1 to Gn may extend substantially in a row direction of the pixels and substantially parallel to each other, and the data lines D1 to Dm may extend substantially in a column direction of the pixels and substantially parallel to each other.

The display panel 10 receives the data voltage corresponding to the change image data SDATA through the data driver 30 in response to the sequentially transmitted gate signal G1 to Gn.

In one exemplary embodiment, for example, the display panel 10 may be an organic light emitting diode ("OLED") display panel, but not being limited thereto.

Figure 3:
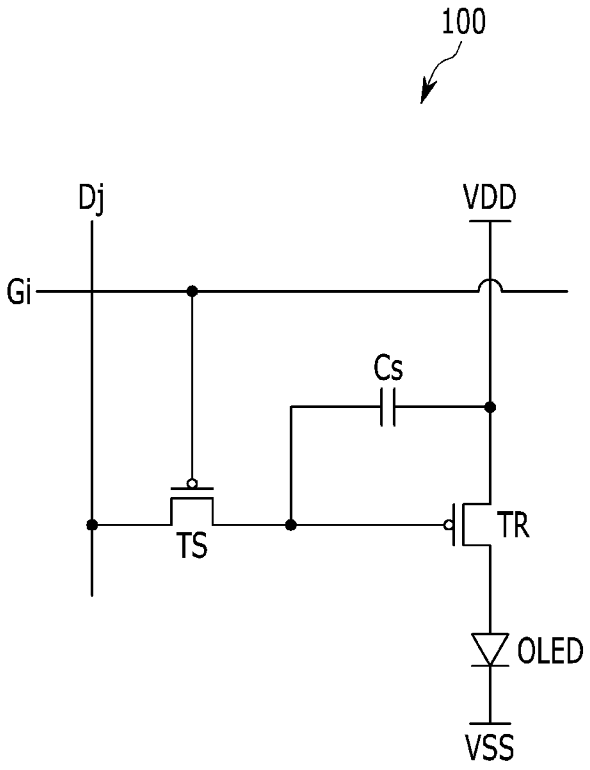
FIG. 3 is a circuit diagram showing a pixel circuit of an exemplary embodiment of a display device according to the invention.

FIG. 3 is a circuit diagram showing a pixel of an exemplary embodiment of a display device according to the invention.

Referring to FIG. 3, a pixel 100 of an exemplary embodiment of the display panel 10 includes a switching transistor TS, a driving transistor TR, a storage capacitor CS, and an OLED. A cathode electrode of the OLED is connected to a first voltage VSS.

The switching transistor TS includes a gate electrode connected to a corresponding gate line Gi of the gate lines G1 to Gn ('i' is a natural number equal to or less than n), and a first electrode and a second electrode connected to a corresponding data line Dj of the data lines D1 to Dm ('j' is a natural number equal to or less than m).

The driving transistor TR includes a gate electrode connected to a second electrode of the switching transistor TS, a source electrode connected to a second voltage VDD, and a drain electrode connected to an anode of the OLED.

The storage capacitor CS is connected between the gate electrode and the source electrode of the driving transistor TR.

When the switching transistor TS is turned on by a scan signal having a gate-on voltage transferred through the corresponding gate line Gi, the data signal is transferred to the gate electrode of the driving transistor TR through the corresponding data line Dj A voltage of the data signal transferred to the gate electrode of the driving transistor TR is maintained by the storage capacitor CS.

Then, a driving current by the voltage maintained by the storage capacitor CS flows in the driving transistor TR. This driving current flows in the OLED, such that the OLED emits light with a luminance corresponding to the driving current.

Figure 4:
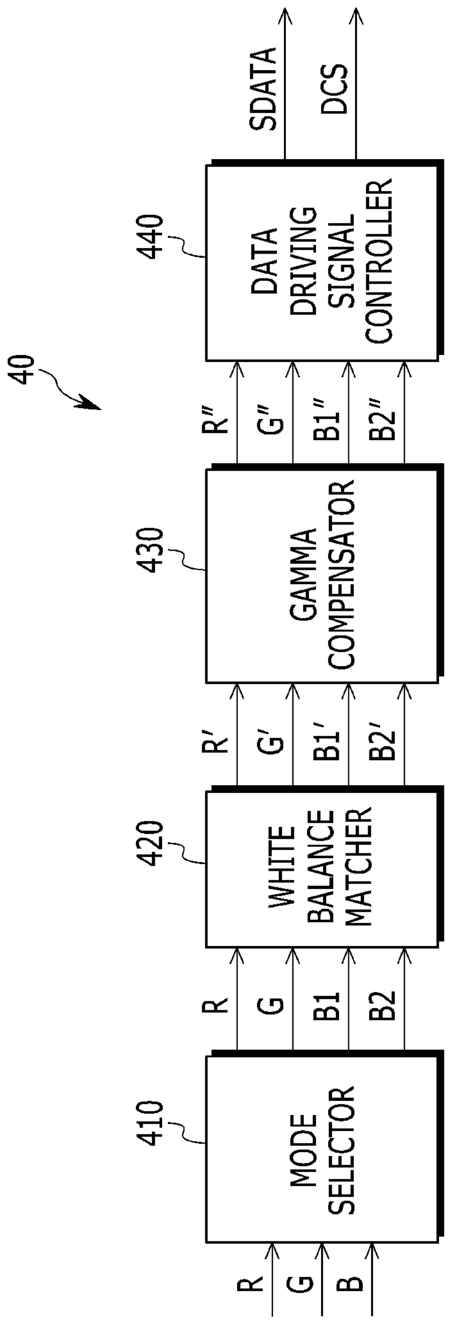
FIG. 4 is a block diagram showing an exemplary embodiment of a signal controller according to the invention.

FIG. 4 is a block diagram showing an exemplary embodiment of a signal controller according to the invention.

Figure 5:
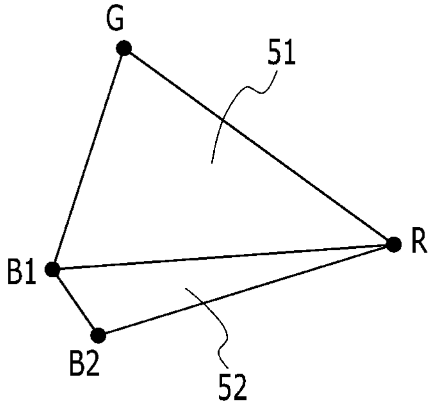
FIG. 5 is a diagram showing color regions of an exemplary embodiment of the signal controller according to the invention.

FIG. 5 is a diagram showing color regions of an exemplary embodiment of the signal controller according to the invention.

Referring to FIG. 4, an exemplary embodiment of the signal controller 40 may include a mode selector 410, a white balance matcher 420, a gamma compensator 430, a data driving signal controller 440.

The mode selector 410 receives the image data signal DATA1, which are divided into red, green and blue image signals R, G and B, and changes the blue image signal B to at least one of a first blue (e.g., a cyan blue) image signal B1 and a second blue (e.g., a deep blue) image signal B2 based on a driving mode. In one exemplary embodiment, for example, the mode selector 410 may divide the image data signal DATA1 into the red, green and blue image signals R, G and B.

In an exemplary embodiment, the mode selector 410 selects any one of a plurality of modes as the driving mode of the display device. In one exemplary embodiment, for example, the mode selector 410 selects any one of a normal mode, a bio-clock mode, a wake-up mode and a sleep mode as the driving mode of the display device.

In such an embodiment, when the display device is in the normal mode, the mode selector 410 changes the blue image signal B into a combination of a cyan blue image signal B1 and a deep blue image signal B2 based on a predetermined blue ratio, which is a ratio between a first blue image (e.g., a cyan blue image) and a second blue image (e.g., a deep blue image) in the image to be displayed (e.g., about 9:1).

In such an embodiment, the blue ratio may be freely adjusted. In an exemplary embodiment where the blue ratio is set to be greater than 1 to allow the cyan blue B1 to exceed the deep blue B2, the life-span of the display panel 10 is substantially improved.

Referring to FIG. 5, the mode selector 410 changes the image data signal DATA1 to be represented by a first color region 51 including red, green and cyan blue R, G and B1, and by a second color region 52 including red, green and deep blue R, G and B2. The mode selector 410 may combine the first color region 51 and the second color region 52 based on the blue ratio, and improves the life-span of the display panel 10 by applying a blue ratio (e.g., about 9:1 or about 8:1), in which an area of the first color region 51 is larger than an area of the second color region 52.

The mode selector 410 transmits the red, the green, the cyan blue and the deep blue image signals R, G, B1 and B2 to the white balance matcher 420.

In an exemplary embodiment, where the display device is in the bio-clock mode, the bio-clock mode may include a day mode and a night mode.

In such an embodiment, the mode selector 410 divides the image data signal DATA1 into the red, green and blue image signals R, G and B, and changes the blue image signal B to the cyan blue image signal B1 during a predetermined day mode time period (e.g., from 9 o'clock AM to 9 o'clock PM), and changes the blue image signal B to the deep blue image signal B2 during a predetermined night mode time period (e.g., from 9 o'clock PM to 9 o'clock AM).

In such an embodiment, the predetermined day mode time period and the predetermined night mode time period may be determined or changed by a user.

In such an embodiment, when the mode selector 410 changes the blue image signal B to only the cyan blue image signal B1 in the day mode, an awakening effect is provided to a user who views an image displayed by the display device. In such an embodiment, when the mode selector 410 changes the blue image signal B to only the deep blue image signal B2 in the night mode, a sleep-inducing effect is provided to a user who views an image displayed by the display device.

In an exemplary embodiment, when the display device is in the bio-clock mode, the mode selector 410 transmits a data signal including the divided red, green, and cyan blue image signals R, G and B1, or a data signal including the divided red, green, and deep blue image signals R, G and B2 to the white balance matcher 420.

In an exemplary embodiment, when the display device is in the wake-up mode, the mode selector 410 changes the blue image signal B to the cyan blue image signal B1 after a predetermined wake-up time (e.g., 7 o'clock AM), and transmits the red, green and cyan blue data signals R, G and B1 to the white balance matcher 420. In such an embodiment, the predetermined wake-up time may be determined or changed by a user.

In such an embodiment, when the display device is in the wake-up mode, the mode selector 410 changes the blue image signal B to only the cyan blue image signal B1, such that the awakening effect is provided to a user who views an image displayed by the display device after the predetermined wake-up time.

In an exemplary embodiment, when the display device is in the sleep mode, the mode selector 410 changes the blue image signal B to the deep blue image signal B2 after a predetermined sleep time (e.g., 10 o'clock PM), and transmits the red, green and deep blue data signals R, G and B2 to the white balance matcher 420. In such an embodiment, the predetermined sleep time may be determined or changed by a user.

In such an embodiment, when the display device is in the sleep mode, the mode selector 410 changes the blue image signal B to only the deep blue image signal B2, the sleep-inducing effect is provided to a user who views an image displayed by the display device.

The mode selector 410 may include a time set-up unit, and the time set-up unit can set up the day mode time period and the night mode time period of the bio-clock mode, the predetermined wake-up time of the wake-up mode, and the predetermined sleep time of the sleep mode.

The white balance matcher 420 matches white balance of the image signals R, G, B1 and B2 provided thereto based on the driving mode of the display device, and transmits a white balanced image signal including the white balance-matched image signals R', G', B1' and B2' to the gamma compensator 430.

The gamma compensator 430 compensates gamma values of the white balanced image signal R', G', B1' and B2', and transmits the compensated image signal R", G", B1" and B2" to the data driving signal controller 440.

A method for matching the white balance in the white balance matcher 420 and a detailed method for compensating the gamma values in the gamma compensator 430 may be any method well-known in the art, and thus any detailed description thereof will be omitted.

The data driving signal controller 440 generates the changed image data signal SDATA corresponding to a mode selected by the mode selector using the compensated image signals R", G", B1" and B2", and generates the data driver control signal DCS.

While this invention has been described in connection with what is presently considered to be practical exemplary embodiments, it is to be understood that the invention is not limited to the exemplary embodiments described herein, but, on the contrary, is intended to cover various modifications and equivalent arrangements included within the spirit and scope of the appended claims.

What is claimed is:

1. A display device comprising:

a signal controller configured to receive an input image signal and to generate a changed image signal, wherein the signal controller divides the input image signal into red, green and blue image signals, changes the blue image signal to at least one of a first blue image signal and a second blue image signal, matches white balance of at least one of the red, green, first blue and second blue image signals, and generates the changed image signal by compensating a gamma value of the at least one of the red, green, first blue and second blue image signals;

a display panel configured to display an image corresponding to the changed image signal, wherein the display panel comprises a pixel comprising a red sub-pixel, a green sub-pixel, a first blue sub-pixel and a second blue sub-pixel; and a data driver configured to receive the changed image signal from the signal controller and to apply a data voltage corresponding to the changed image signal to the display panel, wherein a blue ratio between a first blue image generated from the first blue image signal and a second blue image generated from the second blue image signal in the image to be displayed, is set to be greater than 1 to allow the first blue image to exceed the second blue image to increase the life-span of the display panel.

2. The display device of claim 1, wherein the signal controller comprises:

a mode selector configured to change the blue image signal to the at least one of the first blue image signal and the second blue image signal based on a driving mode;

a white balance matcher configured to generate a white balanced image signal by matching the white balance of the at least one of the red, green, first blue and second blue image signals;

a gamma compensator configured to generate a compensated image signal by compensating a gamma value of the white balanced image signal; and a data driving signal controller configured to generate the changed image signal based on the compensated image signal.

3. The display device of claim 2, wherein, when the driving mode is a normal mode, the mode selector changes the blue image signal to a combination of the first blue image signal and the second blue image signal.

4. The display device of claim 3, wherein the mode selector changes the blue image signal to the combination of the first blue image signal and the second blue image signal based on a predetermined blue ratio, which is a ratio between a first blue image and a second blue image in the image corresponding to the changed image signal.

5. The display device of claim 4, wherein the predetermined blue ratio is greater than 1.

6. The display device of claim 2, wherein when the driving mode is a bio-clock mode, the bio-clock mode comprises a day mode and a night mode, and the mode selector changes the blue image signal to the first blue image signal when the driving mode is the day mode, and changes the blue image signal to the second blue image signal when the driving mode is the night mode.

7. The display device of claim 2, wherein when the driving mode is a wake-up mode, the mode selector changes the blue image signal to the first blue image signal after a wake-up time.

8. The display device of claim 2, wherein when the driving mode is a sleep mode, the mode selector changes the blue image signal to the second blue image signal after a sleep time.

9. The display device of claim 1, wherein the first blue sub-pixel displays a first blue image in the image corresponding to the changed image signal, and the second sub-pixel displays a second blue image in the image corresponding to the changed image signal.

10. The display device of claim 1, wherein an emission layer of the first blue sub-pixel comprises a fluorescent material which emits blue light, and an emission layer of the second sub-pixel comprises a phosphorescent material which emits blue light.

11. The display device of claim 1, wherein an emission layer of the first blue sub-pixel comprises a fluorescent material and a phosphorescent material, and emits light having a wavelength of about 440 nanometers, and an emission layer of the second blue sub-pixel comprises the fluorescent material and the phosphorescent material, and emits light having a wavelength of about 464 nanometers.

12. A driving method of a display device, the method comprising:

dividing an inputted image signal into red, green and blue image signals;

changing the blue image signal to at least one of a first blue image signal and a second blue image signal;

generating a white balanced image signal by matching white balance of at least one of the red, green, first blue and second blue image signals; and generating a changed imaged signal by compensating a gamma value of the white balanced image signal to transmit the changed image signal to a data driver of the display device, wherein a blue ratio between a first blue image generated from the first blue image signal and a second blue image generated from the second blue image signal in the image to be displayed, is set to be greater than 1 to allow the first blue image to exceed the second blue image to increase the life-span of the display panel.

13. The driving method of claim 12, wherein the changing the blue image signal to the at least one of the first blue image signal and the second blue image signal comprises:

changing the blue image signal to the at least one of the first blue image signal and the second blue image signal based on a driving mode of the display device.

14. The driving method of claim 13, wherein the changing the blue image signal to the at least one of the first blue image signal and the second blue image signal comprises:

changing the blue image signal to a combination of the first blue image signal and the second blue image signal when the driving mode is a normal mode.

15. The driving method of claim 14, wherein the changing the blue image signal to the at least one of the first blue image signal and the second blue image signal comprises:

changing the blue image signal to the combination of the first blue image signal and the second blue image signal based on a predetermined blue ratio, which is a ratio between a first blue image and a second blue image in an image to be displayed by the display device based on the changed image signal.

16. The driving method of claim 15, wherein the predetermined blue ratio is greater than 1.

17. The driving method of claim 13, wherein when the driving mode is a bio-clock mode, the bio-clock mode comprises a day mode and a night mode, and the changing the blue image signal to the at least one of the first blue image signal and the second blue image signal comprises:

changing the blue image signal to the first blue image signal when the driving mode is the day mode; and changing the blue image signal to the second blue image signal when the driving mode is the night mode.

18. The driving method of claim 13, wherein the changing the blue image signal to the at least one of the first blue image signal and the second blue image signal comprises:

changing the blue image signal to the first blue image signal after a wake-up time when the driving mode is a wake-up mode.

19. The driving method of claim 13, wherein the changing the blue image signal to the at least one of the first blue image signal and the second blue image signal comprises:

changing the blue image signal to the second blue image signal after a sleep time when the driving mode is a sleep mode.

* * * * *